2,899,311

METHOD OF PREPARING GROUND MEAT PRODUCTS

William J. Zick, Crete, Ill., assignor to B. Heller & Company, a corporation of Illinois No Drawing. Application October 28, 1957
Serial No. 692,527

7 Claims. (Cl. 99—108)

This invention relates to food products. More particularly, it relates to a comminuted meat product containing a carrot pulp conditioner and to the method of producing the same.

In accordance with the invention, dried ground carrot pulp residue is added to a ground meat product, such as sausage meat, as a binder and a conditioner for the meat product. Carrot pulp residue is the material remaining after removal of all or a substantial part of the carotene, protein and mineral constituents by solvent extraction of pulped whole carrots. By incorporating the comminuted carrot pulp residue in the ground meat product, it is possible to use a smaller amount of binder for the ground meat product than heretofore, to impart to the meat product the ability to absorb substantial quantities of moisture while improving the flavor and juiciness of the meat product, particularly after it has been held in storage.

The present invention is based upon the discovery that ground dried carrot pulp from which various constituents have been removed, possesses excellent water absorbing properties which are maintained even upon being subjected to elevated temperatures, during and after cooking. Surprisingly the dried carrot pulp has been found to possess greater water absorbing properties than cereal flours, such as wheat flour, corn flour, oat flour, rice flour, rye flour and soya flour, and does not possess the disadvantages of such cereal conditioners.

Prepared ground meat products such as sausages, frankfurters, encased meats, meat loaves, meat patties, canned luncheon meats, and the like have been heretofore made from ground meat, curing agents, flavoring materials and colloidal water-binding agents. The colloidal water-binding agents function primarily to store water in the product in a form not readily lost by evaporation and serve additionally as emulsifiers for fat therein to give smoothness to the product. This is particularly important to minimize shrinkage in ground meat products which may result from drying.

The cereal conditioners for ground meat products may be selected from the cereal flours such as corn flour, wheat flour and soya flour; the gums such as karaya, tragacanth and locust bean; and other materials such as milk solids, agar agar, algin and alginate salts. These prior art conditioners tend to gel as temperatures are lowered and concentrations increased, and to cause undesirable variations in the desired properties of the ground meat product.

Most of the cooked ground meat products must be heated to at least 155° F. in cooking or smoking. This is true of sausage, of loaf, of encased products and of canned products. This heating tends to denature the cereal conditioners. Heating of these prior art cereal conditioners not infrequently brings about a decrease in the water-binding power of the conditioner and a consequent release of the water. This results in a soft, watery ground meat product. Due to the loss of the released water as by evaporation, there is shrinkage. Also, as the meat products age, the cereal conditioners in their gel form also age and in aging lose water-binding power which is manifested by further shrinkage, accompanied by further loss of water through evaporation.

Carrot pulp or residue resists such decrease in water-binding power at elevated temperatures and maintains a high binding capacity upon aging. A further advantage of the carrot pulp over the prior art binders, such as cereal flours, is that it requires less carrot pulp to hold any given amount of moisture and meat juices. The less pulp required, the more flavorful the sausage or meat loaf that may be produced.

One of the components which is removed or substantially removed from carrot pulp before use in accordance with the invention is carotene, because of its pigmentation value. Protein and minerals as well as all or substantially all of the pectins are removed in the course of solvent extraction to remove the carotene. The carrot pulp or residue is suitable however even if it contains some or all of the minor amount of pectin present in the original carrots.

In contrast to colloidal jellies, such as pectin, which dissolve freely in water and are known to have a high binding power, carrot pulp would be expected to be without value as a replacement for the cereal flours, agar agar, and like colloidal conditioners of the prior art.

In producing sausages, the conventional procedure is followed. Ground meat and meat trimmings, which may be either raw or cured, together with carrot pulp residue, added curing salt and the seasoning (usually consisting of or comprising spices, peppers, spice essence, spice oils, and/or oleoresins) are blended in a suitable chopper. Ice is usually added. The total chopped ice weight may be equal to from about 20% to as much as 100% of the weight of the meat.

As the ice melts, it lowers the temperature of the chopped mixture to minimize and prevent bacterial growth. The ice water is largely absorbed by the comminuted meat. It washes the added salt and seasoning into the meat mixture. The salt and seasoning appears to be more uniformly bound to the product containing the carrot pulp residue than in the case if the carrot pulp residue is omitted.

In the smoke house the sausages usually attain temperatures varying from about 135° F. to 155° F. They usually remain in the smoke house from one to eight hours, depending upon the temperature of the sausages, their variety and the degree of smoking desired. In the smoke house and while the smoke is being absorbed through the pores of the casings, there occur natural phenomena of liquefaction with cereal conditioners which usually tend to effect an undesirable ultimate appearance, structure and quality of the sausages.

If the cereal conditioner becomes too liquid at the smoking temperatures, the casing contents increase in volume. This objectionable result is obviated by the use of carrot pulp residue in accordance with the invention. The carrot pulp particles remain firm and contribute an excellent binding action while retaining the meat product in juicy, well seasoned condition. Ordinarily, the casing contents release free moisture and some of the moisture turns to vapor. The pores of the casings tend to expand, with a resultant stretching or leakage of liquid and vapor from the casings, but this is minimized by the use of carrot pulp residue.

As a result of the phenomena discussed, processed sausages produced by conventional procedures tend to dry out quickly even though cereal moisture conditioning agents are employed. On the other hand, the product of this invention may be stored for a longer period of storage while maintaining the quality, than the product made with the conventional cereal conditioning agents.

The amount of ground carrot pulp residue employed to condition the ground meat product may vary widely, depending upon the nature of the product, the condition in which it is stored, and the procedure utilized in its preparation. A sausage preparation such as bologna or frankfurters may be beneficially conditioned with as little as about 1% of carrot pulp residue by weight of the mixture. Generally, however, it is desirable to use at least about 3% to 4% of the ground carrot pulp residue. Larger amounts up to about 15%–20% by weight may be employed without impairing the flavor and juiciness of the sausage product, but the use of still larger amounts may not be desired if the meat content is to be kept at a maximum. In the absence of a meat content restriction, the larger quantities of carrot pulp employed have the favorable characteristics of the optimum proportions just mentioned.

It is frequently advantageous to blend the carrot pulp residue with the seasoning in order to promote uniform distribution of seasoning and conditioner in the ground meat product. For highly seasoned products were careful balance must be maintained to receive the desired blend of flavors for satisfying a discriminating palate, it is possible to achieve better seasoning control in a shorter mixing time to provide a superior flavored meat product by pre-blending the carrot pulp conditioner and the seasoning. The seasoning appears to be tightly bound to the carrot pulp and is released to the meat and meat juices at a slow rate. This permits expert and close control of seasoning additioning to adjust flavor and taste. At the same time the pre-seasoned carrot pulp residue is stable in storage and easily handled during the preparation of the meat product.

With prepared ground meat sausage mixtures of the non-all-meat type, such as pickle and pimento loaf, the amount of carrot pulp residue generally employed is at least about 1% and preferably about 8% to 15% of the total weight of the finished sausage. This amount may be as high as about 25%–30%. Generally, lesser amounts (8%–10%) are employed as the meat content is higher in the product. Desirable results are obtained in conditioning fresh, uncooked, ground meats such as beef, pork, lamb and veal, or combinations of these in bulk, in patty or in loaf form. These preparations, sold commerically in prepared form for cooking in the home, including items such as pork and veal patties, pork sausage and the like, may be stored in refrigerated counters for long periods without shrinking, while retaining the meat juices and added moisture therein. The beneficial conditioning of the meat product is maintained during the cooking procedure carried out by the housewife in the home.

In a packed ground meat formula such as chili con carne, canned luncheon meat, canned dog and cat foods, etc., the requirement need not be met that the carrot pulp residue be kept below a minimum value as in the case of an all meat sausage product. Accordingly, from about 1% up to about 25% to 30% or more may be used of the carrot pulp residue.

The use of the ground carrot pulp residue produces sausages and loaves which have retained the natural meat juices resulting in maximum flavor and juiciness. The sausage and loaves slice without crumbling and retain their plumpness on storage while on the way to market.

The following examples are given by way of illustration and not by way of limitation. All parts and percentages are by weight.

*Example 1*

A typical cooked frankfurter or bologna sausage formula using ground carrot pulp residue is as follows:

150 lbs. beef
400 lbs. pork
18 lbs. carrot pulp residue
14 lbs. salt
5 lbs. seasoning
1 lb. 6 oz. curing salt
125 lbs. crushed ice The beef is ground through a ⅛ inch plate and the pork trimmings are ground through a 3/16 inch plate. The ground beef is seasoned in a cutter with salt, curing salt, and seasoning and then chopped, adding 20 pounds of ice until the ice is absorbed. The remainder of the ice is added and the mixture is chopped until the temperature reaches 35° F. The carrot pulp residue is added and chopped to 45° F. and the pork is added and chopped. The chopper is operated to reduce the mixture to particles of the requisite size for completing intermixture of the chopper contents.

The chopped solid material containing entrained moisture, is then stuffed into suitable casings, i.e., either natural gut casings or artificial casings. These casings are more or less porous in order that their contents be properly cured by the smoking operation which is next performed.

The sausage is dried and is placed in the smoke house at 135° F., without smoke for 30 minutes. Then, with smoke, the temperature is raised to 150° F. and held for 30 minutes. The temperature is then raised to 165° F. and held for 30 minutes, and at 175° for an added 30 minutes, or until the internal temperature of the sausage is about 142° F.–144° F.

The processed sausages, e.g., frankfurters, bologna, are now cooked at temperatures varying from 155° F. to 175° F. for about 10 minutes.

*Example 2*

A typical pickle and pimento loaf formula using ground dried carrot pulp residue is as follows:

60 lbs. veal
40 lbs. pork, 50% lean
10 lbs. carrot pulp residue
25 lbs. crushed ice
2 lbs. salt
8 oz. sugar
8 oz. seasoning
4 oz. curing salt
4 lbs. diced sweet peppers (red)
4 lbs. pickle relish In the foregoing example, the veal trimmings and pork trimmings are cut in the same manner as in Example 1 in order to grind them to the proper consistency for making the loaf. Crushed ice is added to the veal trimmings and to the pork trimmings and each is separately seasoned in accordance with the same procedure as in Example 1.

The carrot pulp residue is blended with the seasoning, sugar and curing salt during the chopping operation. Chopping is completed when the mixture is fine and uniform.

The sweet diced peppers and pickle relish are blended into the chopped emulsion and worked into baking pans, care being taken to avoid air pockets from forming.

The loaves are then baked in an oven under gradually increasing temperature which is raised from 125° F. to 275° F., for a period of about 4 hours. The internal temperature of the loaf is held at about 150° F.– 155° F. for a period of about 10–15 minutes at the end of the baking cycle, after which the loaves are permitted to cool gradually and are subsequently moved to refrigeration storage. The product may be dipped into gelatin and stuffed into casings.

*Example 3*

A typical chili con carne formula using ground dried carrot pulp is as follows:

315 lbs. beef trim
　　100 lbs. beef fat
　　40 lbs. onions
　　35 lbs. carrot pulp residue
　　31 lbs. tomato puree
　　55 lbs. seasoning
　　10 lbs. salt
　　5 oz. garlic powder
　　195 lbs. tap water The beef trimmings and fat are ground as in Example 1, mixed with the carrot pulp and water, and put into cans which are cooked in a retort at 240° F. for 90 minutes, after which cooking they are cooled and sent to storage or delivery platforms.

The desirable conditioning functions for ground meats is obtained even though the constituents of carrot pulp residue may vary widely in their proportions as a result of variations due to natural origin or due to processing.

Although the invention has been described in connection with specific embodiments thereof, it will be understood that these are not to be regarded as limitations upon the scope of the invention except insofar as included in the accompanying claims.

I claim:

1. The method of preparing ground meat products having enhanced moisture retention comprising adding to a ground meat product an amount of at least 1% by weight of said product of carotene-free, carrot pulp residue and mixing said pulp with said ground meat to provide uniform distribution of said pulp residue throughout said ground meat product.

2. The method of preparing sausage products having enhanced moisture retention comprising adding to a ground meat sausage product an amount of about 3% to about 20% by weight of said product of carotene-free, carrot pulp residue and mixing said pulp with said ground meat sausage product to provide uniform distribution of said pulp residue throughout said ground meat sausage product.

3. The method of preparing canned ground meat products having enhanced moisture retention properties comprising adding to the ground meat product an amount of about 3% to 15% by weight of said product of carotene-free, carrot pulp residue and mixing said pulp residue with said ground meat to provide uniform distribution of the pulp therethrough.

4. The method of preparing ground meat products having enhanced moisture retention properties comprising adding to a ground meat product an amount of at least 1% by weight of said product of carotene-free, carrot pulp residue, mixing said carrot pulp with said ground meat to provide uniform distribution of said pulp residue throughout said ground meat product and cooking said mixture.

5. The improvement in the art of making sausage which consists of introducing in the sausage casing contents an amount of between about 3% and about 20% of carotene-free, carrot pulp residue sufficient to bind moisture in the said contents and prevent its escape from the casing during slow processing and to jell the free moisture residual in the casing when the sausage is cooled.

6. The improvement in the art of making sausage which consists of introducing in the sausage casing contents an amount of between about 3% and about 20% of carotene-free, carrot pulp residue in admixture with seasoning which is bound to said pulp, the amount of said pulp residue being sufficient to bind moisture in the said contents and prevent its escape from the casing during slow processing and to jell the free moisture residual in the casing when the sausage is cooled.

7. The improvement in the art of making sausage which consists of introducing in the sausage casing contents an amount of between about 3% and about 20% of solvent extracted pulped carrots in admixture with seasoning which is bound to said pulp, the amount of said pulp residue being sufficient to bind moisture in the said contents and prevent its escape from the casing during slow processing and to jell the free moisture residual in the casing when the sausage is cooled.

References Cited in the file of this patent

UNITED STATES PATENTS

| | | |
|---|---|---|
| 1,909,508 | Schick | May 16, 1933 |
| 2,355,548 | Musher | Aug. 8, 1944 |
| 2,447,427 | Oftedahl | Aug. 17, 1948 |
| 2,635,963 | Glabe | Apr. 21, 1953 |